(12) United States Patent
Guichard et al.

(10) Patent No.: US 8,482,629 B2
(45) Date of Patent: Jul. 9, 2013

(54) PROCESSING METHOD FOR A RELATIVE ILLUMINATION PHENOMENON ON A DIGITAL IMAGE AND ASSOCIATED PROCESSING SYSTEM

(75) Inventors: Frédéric Guichard, Paris (FR); Michaël Kraak, Chatillon (FR)

(73) Assignee: DXO Labs, Boulogne Billancourt (FR)

( * ) Notice: Subject to any disclaimer, the term of this patent is extended or adjusted under 35 U.S.C. 154(b) by 443 days.

(21) Appl. No.: 12/296,019

(22) PCT Filed: Apr. 5, 2007

(86) PCT No.: PCT/FR2007/051075
§ 371 (c)(1),
(2), (4) Date: Mar. 6, 2009

(87) PCT Pub. No.: WO2007/116186
PCT Pub. Date: Oct. 18, 2007

(65) Prior Publication Data
US 2009/0251567 A1    Oct. 8, 2009

(30) Foreign Application Priority Data
Apr. 6, 2006    (FR) .................................... 06 51242

(51) Int. Cl.
*H04N 9/73*    (2006.01)
(52) U.S. Cl.
USPC ..................... 348/223.1; 348/222.1; 348/234; 382/167; 382/274; 382/275

(58) Field of Classification Search
USPC ................... 348/223.1, 229.1; 382/167, 274, 382/275
See application file for complete search history.

(56) References Cited

U.S. PATENT DOCUMENTS

| | | | |
|---|---|---|---|
| 5,805,213 A * | 9/1998 | Spaulding et al. | 348/222.1 |
| 5,818,523 A | 10/1998 | Ban | |
| 6,573,932 B1 * | 6/2003 | Adams et al. | 348/224.1 |
| 6,831,687 B1 * | 12/2004 | Suzuki | 348/251 |
| 7,002,624 B1 * | 2/2006 | Uchino et al. | 348/225.1 |
| 2005/0146733 A1 | 7/2005 | Lohweg et al. | |
| 2005/0185066 A1 | 8/2005 | Nishimura | |
| 2006/0045512 A1 | 3/2006 | Imamura et al. | |
| 2007/0177032 A1 * | 8/2007 | Wong | 348/223.1 |

FOREIGN PATENT DOCUMENTS

| | | |
|---|---|---|
| JP | 2003-069889 | 3/2003 |
| JP | 2004-247880 | 9/2004 |
| JP | 2005-352789 | 12/2005 |
| JP | 2006-054927 | 2/2006 |

* cited by examiner

*Primary Examiner* — Sinh Tran
*Assistant Examiner* — Paul Berardesca
(74) *Attorney, Agent, or Firm* — Patterson Thuente Pedersen, P.A.

(57) ABSTRACT

A method and an associated system, for digital image-processing, intervening for any relative illumination phenomenon, including that of a colored relative illumination. To this end, it is provided to take account of an illuminant of a photographed scene in order to provide the appropriate modifications to any digital image to be processed.

19 Claims, 7 Drawing Sheets

PROCESSING METHOD FOR A RELATIVE ILLUMINATION PHENOMENON ON A DIGITAL IMAGE AND ASSOCIATED PROCESSING SYSTEM

RELATED APPLICATIONS

The present application is a national stage entry of PCT Application No. PCT/FR2007/051075, filed Apr. 5, 2007, which claims priority from French Application Number 0651242, filed Apr. 6, 2006, the disclosures of which are incorporated by reference herein in their entireties.

TECHNICAL FIELD OF THE INVENTION

The present invention is related to a processing method of a relative illumination phenomenon on a digital image. It also concerns a processing system for such relative illumination phenomenon. The purpose of the invention is essentially to propose a solution for a relative illumination phenomenon adapted to new types of sensors intervening inside digital image-capturing apparatus.

BACKGROUND OF THE INVENTION

The field of the invention is, generally speaking, that of a digital photograph and, more specifically, that of the image processing applied to digital photographs. By digital photograph is meant a photograph obtained as a result of printing a digital image. Generally speaking, a digital image is comprised of pixels, each pixel designating a position and a portion of the image space, each pixel having at least a pixel value. The images stemming from all photographic apparatus, called "photographic images", are images having a dimension two, within the meaning of the image space as a rectangular portion of a plane. However, images, notably stemming from physical or medical observations, may have increased dimensions, notably three. Likewise, a video stemming, for example, from a camcorder, may be considered as a succession of images with a dimension two, or as a single image with a dimension three: the first two dimensions being, in this case, the dimensions of the images and the third dimension representing the image number within the video.

A digital image is acquired using a digital capturing apparatus. Generally speaking, a digital capturing apparatus is an apparatus comprising at least one sensor and one optical system, adapted to obtain a digital image. A sensor is a system converting light into digital values reflecting the color intensity of each point of the digital image. A sensor can notably contain a photosensitive receiver enabling to convert the photon energy into electric energy. Within a standard sensor structure, such photosensitive receiver can be defined as a set of photosites. The photosites can notably be associated with a particular color like, for example, in the case of a Bayer structure containing two green photosites, a red photosite and a blue photosite. Generally speaking, an optical system is a set of lenses, mirrors and transparent and homogeneous media separated by dioptres.

Within the field of digital photography, due to the digitalization of the photographic manufacturing chain, as from its capture to its reproduction on paper, it is more and more frequent to propose image-processing solutions capable of removing certain apparent faults on a large number of digital images acquired using digital capturing apparatus. For example, a very frequent fault is the one known as the "red-eye" phenomenon. Other problems relating to the use of photographic apparatus exist, whether they are in fact digital or not. Hence, for example, distortion problems are frequently encountered. Generally speaking, a known distortion phenomenon is the geometric distortion, characterized like a geometric aberration and in the presence of which the object points, aligned within the photographed scene, do not form aligned image points. Such geometric distortion is characterized by an image-enlargement modification depending on the position within the field. Two types of distortions can be distinguished: cylinder-shaped distortions and cushion-shaped distortions depending on whether the local enlargements diminish or increase when nearing the edge of the field.

Another problem encountered is known under the name of lateral and longitudinal chromatic aberrations. Generally speaking, known chromatic aberration phenomena concern the lateral and longitudinal chromatic aberrations, such as a geometric aberration in the presence of which the image enlargement varies according to the wavelength. In the context of lateral chromatic aberration, the image is shaped on the same plane, whatever the wavelength, although its position on the plane depends upon the wavelength. In the context of longitudinal chromatic aberration, the position of the focusing plane varies according to the wavelength, which generates a different blur depending on the wavelength. The chromatic aberration generates colored irisations in the vicinity of the image transitions. Various solutions have been proposed in the state of the art in order to deal with such problems.

Another known problem in the field of photography, and notably that of digital photography, is a problem designated by the relative illumination phenomenon expression.

Relative illumination refers to the phenomenon inducing a variation of the pixel values on a digital image according to the positions of the pixels in the field. For example, for a digital image of a homogeneous scene, the relative illumination phenomenon corresponds to a variation of pixel values according to their position in the field. It becomes noticeable by a darkening of the corners, or even by a loss of data. FIG. 1 shows such type of relative illumination phenomenon: here a curve 10 represents a darkening phenomenon, graded on the axis of the ordinates, according to a position within the image, relating to a reference point, graded on the axis of the abscissa.

Several relative illumination sources can be identified for an image stemming from an apparatus:

A lens is characterized by its field angle and by its field coverage. The sources are calculated so as to cover a given photosensitive receiver format. The relative illumination is largely due to a window effect inside the lens. A full beam parallel to the axis entering the lens is transmitted, whereas an oblique beam will be partially stopped by the lens mount, so as not to be transmitted beyond a borderline angle. If the lens is designed to form a field of full light having the dimensions of the photosensitive surface for a certain aperture value, it is possible that when fully open, the surface of the receiver exceeds that of the field in full light, which will cause a darkening of the corners of the image. There is a relative illumination phenomenon when the field coverage is lower than the format of the sensitive surface.

Within the field covered by a lens, the lighting is not rigorously uniform in accordance with the rays comprising its image due to the simple fact of photometry and geometry. The further the image away from the axis, the more the relative illumination phenomenon is enhanced.

The digital sensors, in light of their design, provide a variable response depending on the incidence of the rays affecting it. The further the image away from the axis, the more the relative illumination phenomenon is enhanced.

The relative illumination phenomenon can be caused by the obstruction of the image ray through a body of the apparatus, or by an accessory placed within the lens field. This may, for example, be due to the mount of a filter, or more commonly to an unsuitable sun-shade.

The relative illumination phenomenon can be measured on an image stemming from an apparatus having an exposure rating, the relative illumination value measuring the exposure-rating difference between the quantity of light received by the edges of the digital image and that received at the center of the digital image.

Solutions to such relative illumination phenomenon have been proposed in the state of the art.

Nevertheless, the appearance of new sensors intervening inside the digital image-capturing apparatus gives rise to a new problem, designated as the colored relative illumination. The colored relative illumination refers to the phenomenon inducing a variation of the pixel values on a digital image according to the positions of the pixels within the field depending on the digital image color channels. An image can be decomposed into channels in many ways, having an image pixel thus corresponding to a pixel value for each one of the channels. In the particular case of the color images, the decomposition into channels, such channels thus being called "color channels", can notably be performed using a decomposition inside the RGB, sRGB, LMS, Lab, Yuv, HSL, HSV, XYZ, xyz color spaces. Such terms, with the exception of sRGB, are defined, for example, in the following publication: "Measuring Color", Third Edition, R. W. D. Hunt, Fountain Press, Kingston-upon-Thames, England 1998, ISBN 0863433871, or in the publication "Color Appearance Models", M. Fairchild, Addison Wesley, 1998, ISBN 0201634643. The sRGB color space is described in the IEC standard 61966-2-1, "Multimedia systems and equipment—Colour measurement and management—Part 2-1: Colour management—Default RGB colour space & sRGB". In the context of the invention, the digital image may also be constituted of one or several channels relating to other data having no relation to the color like, for example, the digital values relating to the physical dimensions, notably altitude, distance and temperature.

In the case of a digital image, observation of the colored relative illumination phenomenon is, for example, the relative illumination measurement in exposure rating on each color channel. The exposure ratings are not all identical in the case of a colored relative illumination phenomenon. FIG. 2 shows such colored relative illumination phenomenon: here a first curve 20, respectively a second curve 21, represents an exposure rating for a first color channel, respectively for a second color channel, graded on the axis of the ordinates, according to a position within the image, relating to a reference point, graded on the axis of the abscissa. As observed, the colored relative illumination phenomenon varies from one color channel to another. A colored relative illumination phenomenon is represented here, varying within a single dimension, for example, a distance to a point. In another embodiment, such colored illumination phenomenon varies according to several dimensions of the image.

By light source is meant a physical transmitter of visible energy. Examples of light sources are the sky at different times of the day, neon lighting, and a tungsten bulb. An illuminant represents the spectral distribution of a light source. A spectral distribution represents a radiometric quantity according to the wavelength. Such radiometric quantity can notably be the spectral exposure in the case of a light source, or the result of the spectral reflection factor from the material by the spectral distribution of a light source in the case of a material reflecting the light, or the result of the light transmittance from a material by the spectral distribution of a light source in the case of a material transmitting light. Some illuminant examples are: the CIE A illuminant representing the source of light in the form of a Planck radiator having a color temperature of 2856 K, the CIE D65 illuminant which is a statistic representation of the average daylight corresponding to a color temperature of approximately 6500 K, the CIE C illuminant, the CIE E illuminant, the CIE D illuminants (including the CIE D50 illuminant), the CIE F illuminants (including CIE F2, CIE F8 or CIE F11). Such terms and other illuminant examples are defined, for example, in the following publication: "Measuring Color", Third Edition, R. W. D. Hunt, Fountain Press, Kingston-upon-Thames, England 1998, ISBN 0863433871, or in the following publication, "Measuring Color", Third Edition, R. W. D. Hunt, Fountain Press, Kingston-upon-Thames, England 1998, ISBN 0863433871, or in "Color Appearance Models", M. Fairchild, Addison Wesley, 1998, ISBN 0201634643.

FIG. 3 illustrates that the colored relative illumination phenomenon, for a given color channel, varies for two different illuminants. In this figure, a first curve 30, respectively a second curve 31, represents a relative illumination phenomenon for a first type of illuminant, respectively for a second type of illuminant, graded on the axis of the ordinates, according to a position within the image, relating to a reference point, graded on the axis of the abscissa. As observed, the colored relative illumination phenomenon varies from one color channel to another. A colored illumination phenomenon is represented here, varying within a single dimension, for example, a distance to a point. In another embodiment, such colored illumination phenomenon varies according to several dimensions of the image.

A given illuminant is associated with a spectral distribution of the light source depending on the wavelength, as illustrated in FIGS. 4 and 5, showing respectively a first curve 40 providing the spectral distribution of a first illuminant, and a second curve 50, providing the spectral distribution of a second illuminant.

The photon energy quantity of the incident light on the digital sensor may vary according to the illuminants, as illustrated in FIGS. 6 and 7, showing respectively:
  a first curve 60 providing the amplitudes of the signals transmitted to two different wavelengths for a first illuminant, under the same angle of incidence, for a given sensor.
  a second curve 70 providing the amplitudes of the signals transmitted to two different wavelengths, the same as those shown in FIG. 6, for a second illuminant, under the same angle of incidence, and for the same given sensor.

The quantity of photon energy depending on the wavelength can be modified according to the specifications of the optical system, such as the existence of filters able to modify the energy transmitted depending on the wavelength of the incident light on the filter.

A digital sensor has a spectral response: the amplitude of the digital values reflecting the intensity of the color channels of each point of the digital image depends upon the wavelength of the incident light on the sensor. The light angle of incidence on the sensor notably depends upon the specifications of the optical system, such that an optics authorizing the high chromatic aberrations or even the value of the average ray angle, i.e. the angle between the optical axis of the optical system and the ray passing through the summit of the object and the center of the pupil.

A digital sensor does not emit the same response on each part of the photosensitive receiver depending on the angle of incidence of the rays affecting it, as illustrated in FIG. 8, such Figure showing a first curve 80 and a second curve 81 which respectively corresponds to a first spectral response of a given sensor for a first angle of incidence i1, and to a second response given by the same sensor for a second angle of incidence i2.

The reasons for such a phenomenon can be:

asymmetries in the physical constitution of the sensor: photosites having different implantation angles on the sensor;

various micro-lenses according to the photosites, the micro-lenses being optical systems designed to focus the incident rays on the digital sensor in the direction of the photosensitive receivers that are the photosites for improving the result thereof;

different wiring depending on the photosites;

different 3D geometry according to the photosites, for example due to the existence of transistors or of non-symmetric connections;

different physical implantations within the field;

different geometry for adjacent photosites;

characteristics of an IR filter, i.e. a filter especially allowing the passing of light, the wavelength of which being comprised between, for example, 425 and 675 nm. Depending on the orientation of the rays, the light transmittance properties of the filter may vary by several tens of nm, inducing a different behavior at color level in the corner and at the center of the image; and different orientations according to the color of the photosites.

The greater the angle, the more it is possible that the incident rays do not affect the most sensitive zone of the sensor, or are stopped, for example, by the opaque shields which cover the transfer registers. Generally speaking, the response of the sensor may decrease when the angle of incidence increases. The image of a point is not formed by a ray, but by a beam of rays whose incidence is comprised between two borderline values. The many incidences comprising such beam will be differently interpreted by the sensor, i.e. the energy of the incident light on the photosensitive receivers will not be the same for all wavelengths, and this, even for the adjacent photosites.

The adjacent photosites may represent different color channels. In each photosite to which at least one geometric position on the sensor corresponds, in addition to physical specifications such as described above, the amplitude of the signal notably depends upon the spectral response of the sensor in accordance with the wavelength of the incident light on the photosite and with the angle of incidence of such light, the photon energy of such light depending upon the illuminant and the specifications of the optical system. The colored relative illumination is linked to the illuminant and to the pixel value in each color channel of the digital image's pixels, the pixel values depending upon the amplitude of the signal of a certain number of the sensor's photosites.

All such phenomena and considerations entail the appearance of a relative illumination phenomenon, for example, a colored relative illumination on the photographs taken using digital image-capturing systems. The quality of the photographs is thus affected.

SUMMARY OF THE INVENTION

The purpose of the invention is to provide a solution to the problems and inconveniences that have just been described.

Generally speaking, embodiments of the invention are directed to a digital image-processing method, intervening at the level of any relative illumination phenomenon, including that of a colored relative illumination. To this end, in embodiments of the invention, to take an illuminant of a photographed scene into consideration in order to provide the appropriate modifications to any digital image to be processed.

Embodiments of the invention thus essentially concerns a processing method for a digital image, representing a scene, to be processed, the digital image to be processed being acquired using a digital capturing apparatus comprising a sensor and an optical system, the method includes:

determining the illuminant of the represented scene on the acquired image to be processed;

modifying, on the digital image to be processed, a relative illumination phenomenon according to the illuminant.

Besides the main specifications having just been mentioned in the previous paragraph, the method according to embodiments of the invention may represent one or several additional specifications from among the following:

modification can include modifying the relative illumination variation within the digital image and/or the relative illumination variation from a color channel to the other of a digital image;

modification can be performed using relative illumination modification parameters;

the relative illumination modification parameters are selected and/or calculated;

the step consisting of determining the illuminant of the scene is performed using a result from a white-balance estimation algorithm;

the determination of the illuminant depends upon user choice;

the determination of the illuminant depends upon activation of a flash;

the modification parameters have been pre-calculated for a predetermined number of illuminant types;

the modification parameters are calculated using all or part of the pre-calculated modification parameters;

the digital image to be processed is a superposition of several color channels, the modification parameters being selected and/or calculated for each color channel;

modifying the relative illumination phenomenon can comprise the operation consisting of reducing and/or cancelling and/or bringing a first threshold value down below an offset relative illumination measurement within the image to be processed;

modifying the relative illumination phenomenon can comprise the operation of reducing and/or cancelling and/or bringing, for each color channel, a second threshold value down below a relative illumination measurement within the image to be processed;

the modification parameters are gain values to be applied to at least one of the color channels;

the relative illumination modification depends upon at least one variable parameter of the capturing apparatus, the variable parameter notably being a focal distance, a focusing distance and/or the distance estimated from the imaged scene, an exposure time, a gain, a sensitivity, an exposure level, or an aperture used by the capturing apparatus, for the purpose of acquiring the digital image to be processed;

the determination of the illuminant of the scene represented on the acquired digital image to be processed uses data from the illuminant of the scene on one or several digital images acquired prior to the digital image to be processed;

at least one of the steps for determining the illuminant, or for modifying the relative illumination phenomenon, can be carried out inside an external processing apparatus, different from the capturing apparatus;

at least one of the steps for determining the illuminant, for modifying the relative illumination phenomenon, or for modifying the relative illumination phenomenon, can be carried out inside the capturing apparatus;

modifying the relative illumination takes account of the specifications of one or several filters included in the optical system and/or the sensor making the relative illumination vary in accordance with the illuminant;

modifying the relative illumination takes account of the specifications of an optical system representing longitudinal chromatic aberrations making the relative illumination vary in accordance with the illuminant.

Embodiments of the present invention also refer to a digital image-processing system, for the purpose of processing a digital image representing a scene, acquired using a digital capturing apparatus including a sensor and an optical system, the system being capable of implementing the method according to at least one embodiment of the invention, the system comprising means for determining the illuminant of the scene represented on the acquired digital image to be processed, as well as means for modifying, on the digital image to be processed, a relative illumination according to the illuminant. In a particular embodiment of the invention, the system is integrated at least partially into the capturing apparatus.

The invention and its various applications will be better understood after reading the following description.

DETAILED DESCRIPTION

Figure 1:
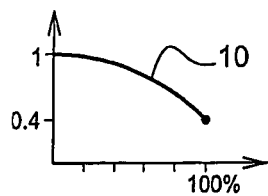
FIG. 1 is a graph representing a darkening phenomenon according to a position within the image relating to a reference point.
Figure 2:
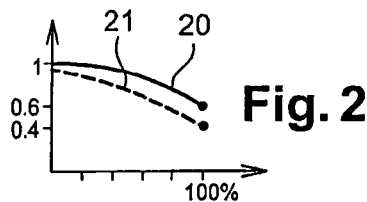
FIG. 2 is a graph representing an exposure rating according to a position within the image relating to a reference point for a first color channel and for a second color channel.
Figure 3:
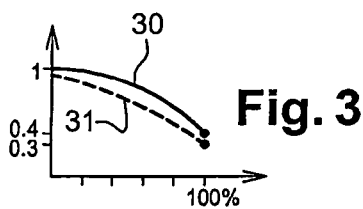
FIG. 3 is a graph representing a relative illumination phenomenon according to a position within the image relating to a reference point.
Figure 4:
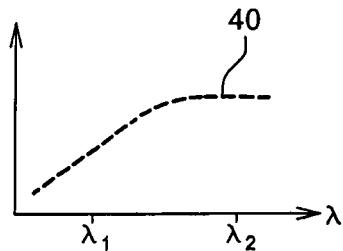
FIG. 4 is a graph providing a spectral distribution of a first illuminant.
Figure 5:
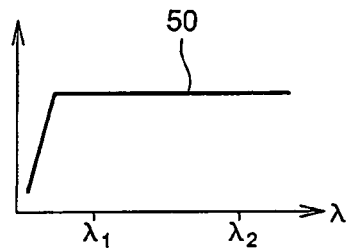
FIG. 5 is a graph providing a spectral distribution of a second illuminant.
Figure 6:
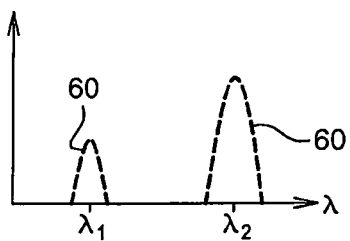
FIG. 6 is a graph representing the amplitudes of the signals transmitted to two different wavelengths for a first illuminant, under the same angle of incidence, for a given sensor.
Figure 7:
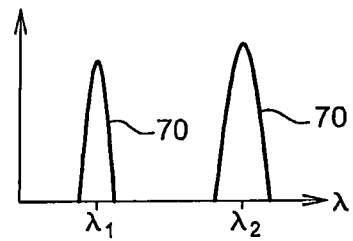
FIG. 7 is a graph representing the amplitudes of the signals transmitted to the two different wavelengths of FIG. 6, for a second illuminant under the same angle of incidence, and for the same given sensor of FIG. 6.
Figure 8:
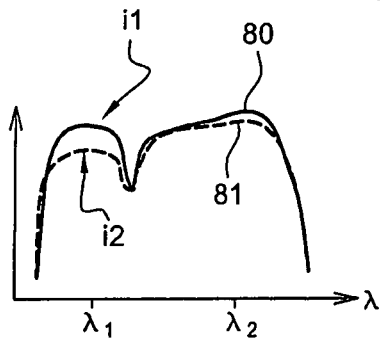
FIG. 8 is a graph representing a first spectral response of a given sensor for a first angle of incidence, and to a second response given by the same sensor for a second angle of incidence i2.
Figure 9:
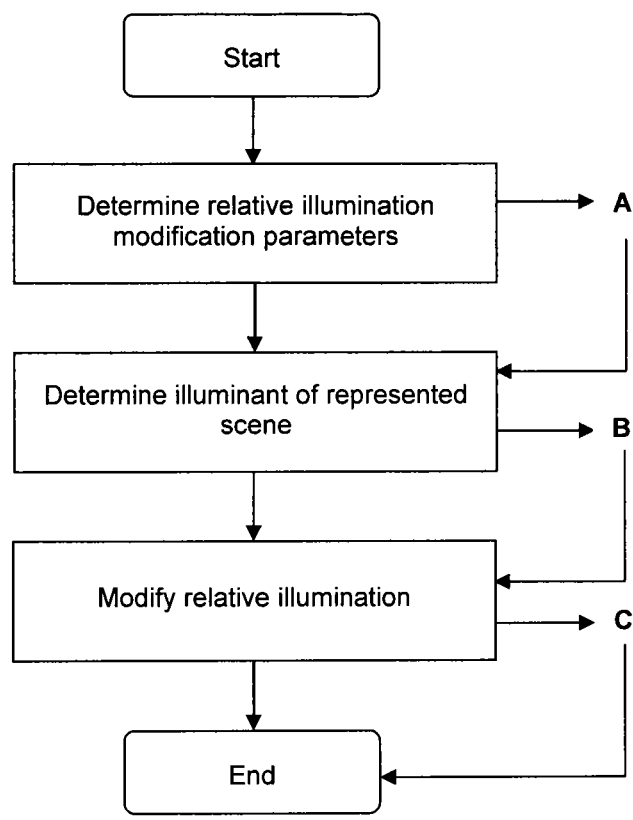
FIGS. 9-10D are flow charts according to an example embodiment of the invention.
Figure 10A:
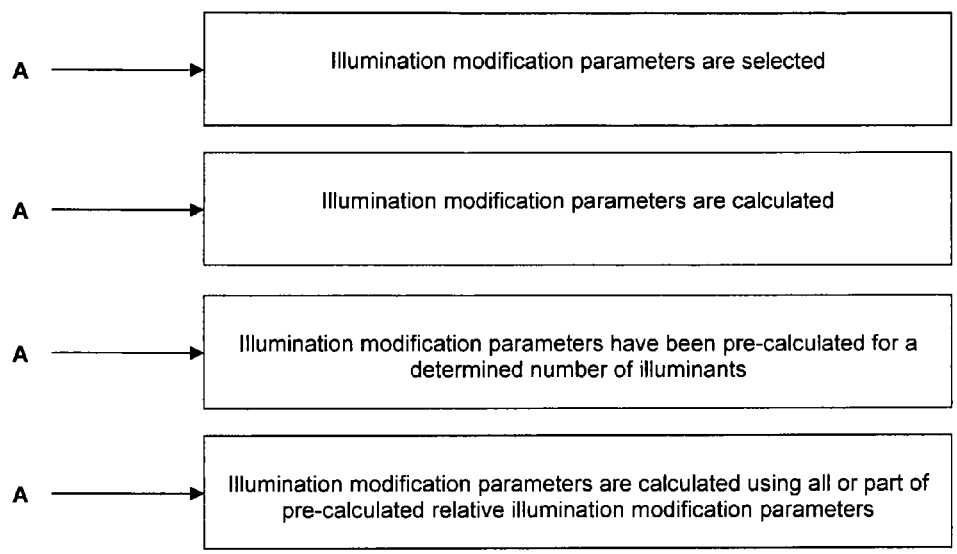
Figure 10B:
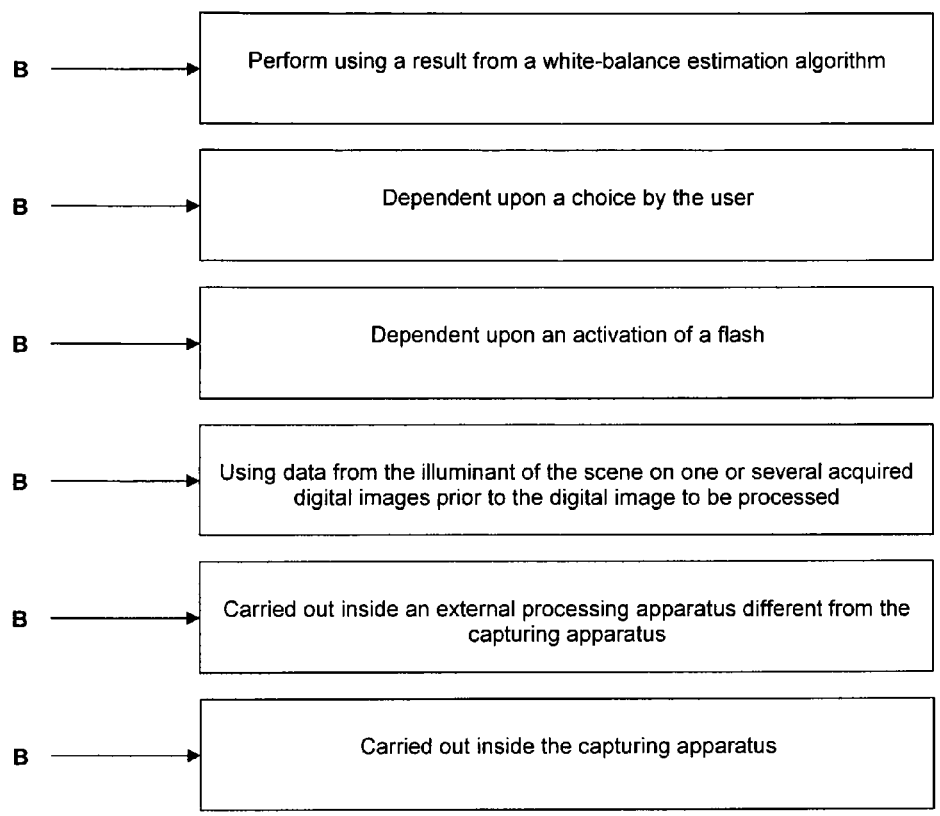
Figure 10C:
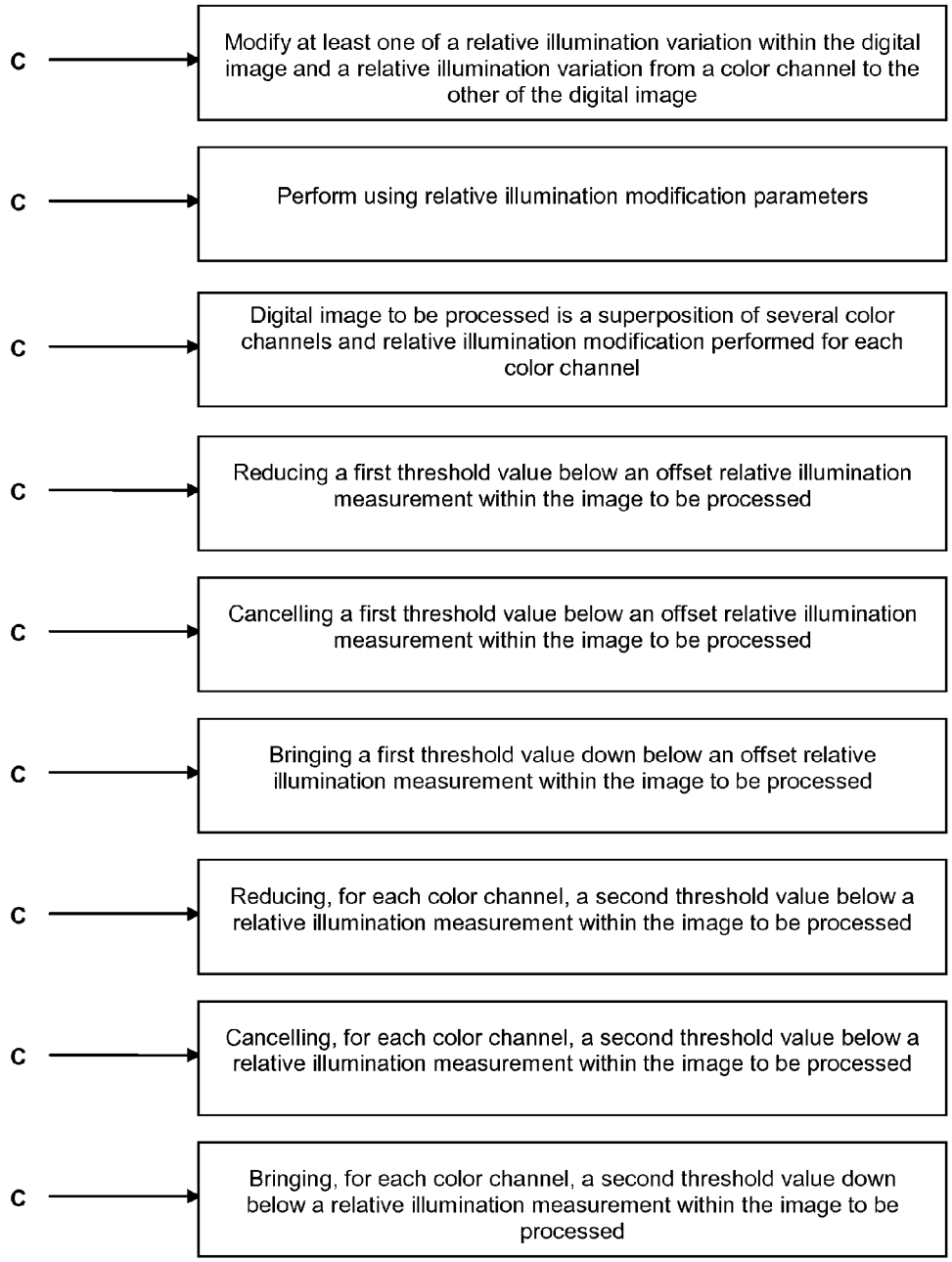
Figure 10D:
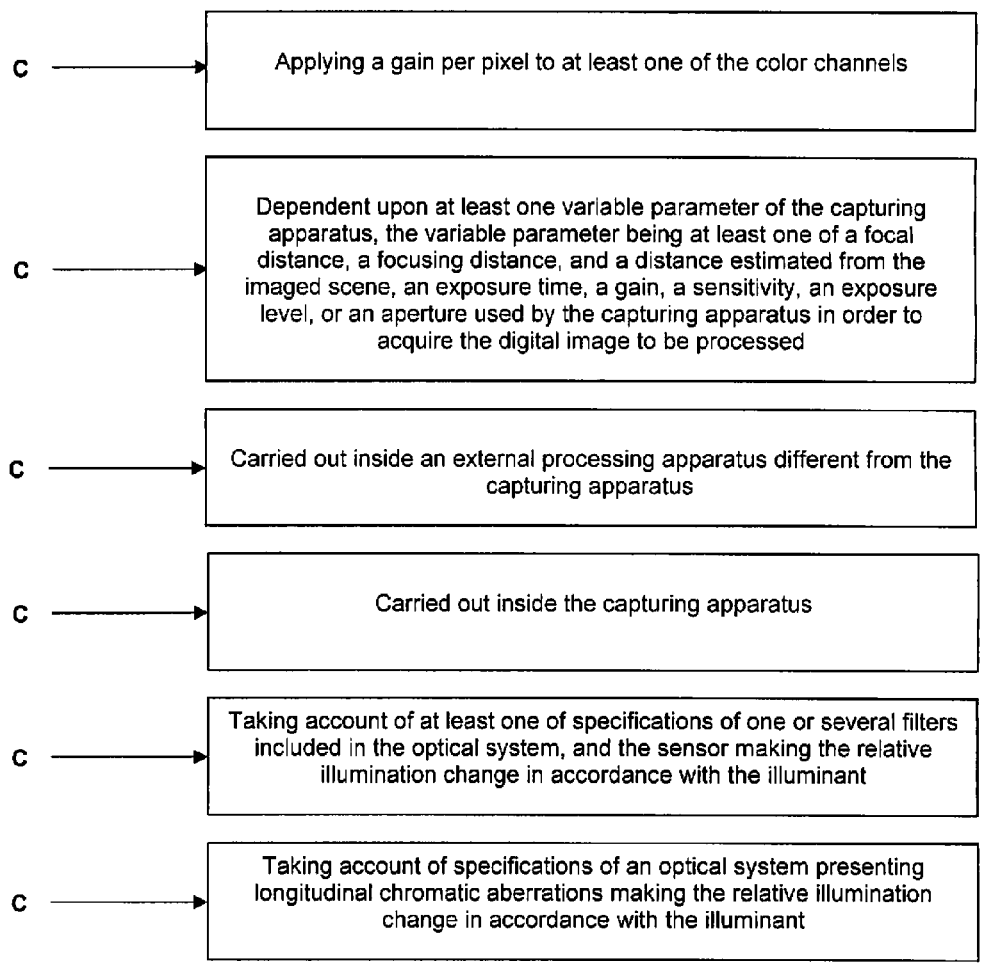
Figure 11:
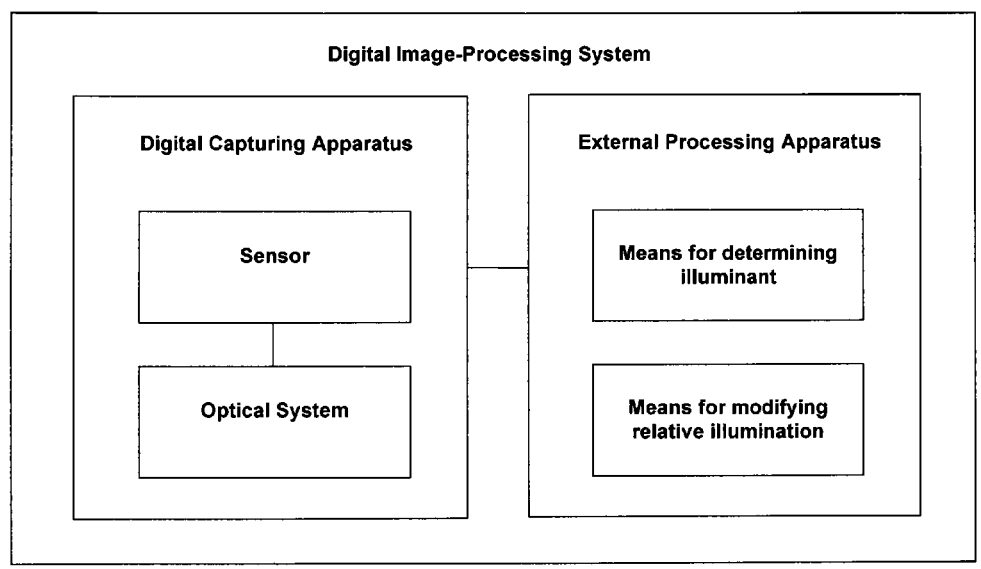
FIG. 11 is a block diagram of an example embodiment of the invention.

In order to process any relative illumination phenomenon, the method according to embodiments of the invention includes at least two steps, the different implementation modes of which are described below.

A first step of the method according to an embodiment of the invention includes determining an existing illuminant during the capture of a scene visible on a digital image to be processed.

In the first example of implementing this step, a white-balance estimation algorithm will be used.

A given light source corresponds to a spectral distribution depending on the wavelength. This implies that certain wavelengths, hence certain colors of the visible, for example located between 400 and 800 nm, are more or less represented under certain light sources. For example, in tungsten lighting, for a low color temperature, the radiometric quantities of the wavelengths corresponding to the blue in the field of the visible are hardly represented in relation to those associated with the wavelengths of the red, such ratio being inversed when the color temperatures of the light sources increase. The human eye naturally compensates such difference in balance between the colors, whatever the illuminant, thus interpreting a grey wall as being grey in low color temperature just as in high color temperature. Compensation consists in particular of modifying the ratios between the color channels in order to obtain a result on the image nearing that of the human eye within a known context, notably in terms of the color channel ratio. A sensor does not automatically compensate the radiometric quantity differences in accordance with the wavelengths. Hence, the image of a grey wall by a sensor under a low-temperature light source, such as a tungsten bulb, will have a dominant yellow hue due to the lack of blue.

When the eye looks at a photograph, the color compensation of the illuminant depends upon the light in the place of visioning the photograph, rather than upon the light existing in the photographed scene. Hence, it is important, in the context of photography, that compensation is performed prior to reproducing the image. In digital photographic apparatus, such compensation is done inside the apparatus using embedded digital processing. A means for compensating the colors includes applying a white balance algorithm so that the digital image represents a color result as near as possible to that obtained by the human eye in the capture context. Most of the digital capturing apparatus are equipped with an automatic white balance determination algorithm. A type of implementation of an automatic white balance algorithm includes taking account of the color channel proportions within the images stemming from the sensor like, for example, the red on green and/or the blue on green ratios, thereby determining the multiplier factors to be applied on each one of the color channels, in the form of analogical and/or digital gains. In the context of the invention, the use of an automatic white-balance algorithm enables to retrieve data concerning the illuminant corresponding to the light source. Data is used to compensate the channels by applying a gain in accordance with the position and/or the channel and/or the maximum of the channels and the illuminant in order to cancel the variations of intensity and of color depending on the position within the image provoked by the optical system and the sensor (including the optical elements, such as filters and micro-lenses). An example of data on the illuminant consists of the gains to be applied on each channel in order to compensate the channels. Another example of data is an N×N matrix (N being a natural whole representing the number of channels) implicating N pixel channels and aiming at modifying the variations differentiated between N channels whose colored relative illumination is to be modified. The modification parameters of the colored relative illumination may be digital data formatted like, for example, scalars, tables, polynomials, matrixes, interpolated tables. An example of data is a polynomial for each color channel. The polynomials depend upon the position within the image. The polynomials may be in X,Y, X and Y, indicating the coordinates of the pixels within a 2D space, or polynomials in R, R indicating a distance to a point of the field considered as the geometric center of the image or elsewhere, the coordinates of the center possibly being different depending on the channels. The data may be obtained by evaluating the polynomial in each pixel for each channel, or by using a table of values providing the values for geometric zones of the image like, for example, values every KX or KY pixels, KX and KY being for a 2D image, an equal or different number of pixels depending on the geometric coordinates of the image.

For example, the data supplied by the automatic white balance algorithm may be of the type lower alpha blue level to the green level and upper beta red to the green level, which enables to identify a tungsten illuminant. Furthermore, the data is of the type lower gamma blue level to the green level and lower delta red to the green level, enabling, for example, to identify a daylight illuminant called "D65".

In another implementation example, a user of an apparatus implementing the method according to an embodiment of the invention supplies data enabling to determine the identifier. In a first case, this can be done upon request from the apparatus that he/she is using. For example, a displayable menu on a LCD screen proposes a list of standard illuminants; in such menu, the following choices may, for example, be found: tungsten, neon lighting, daylight, cloudy, shade, flash, color temperature to be defined by the user, automatic mode. Other illuminants are defined, for example, in the publications "Measuring Color", Third Edition, R. W. D. Hunt, Fountain Press, Kingston-upon-Thames, England 1998, ISBN 0863433871, or in "Color Appearance Models", M. Fairchild, Addison Wesley, 1998, ISBN 0201634643.

The user thus selects, using appropriate buttons on the apparatus to be activated by him/her, one of the illuminants in the list.

In a second case, the apparatus may use data linked to the conditions of use of the considered apparatus; for example, the fact that the scenery function is selected implies that the user is employing his/her apparatus outdoors, the determined illuminant thus being daylight.

In one example of an implementation mode, data relating to the use of a flash for capturing an image to be processed is employed, thereby determining the illuminant of the scene corresponding to the image.

A flash is activated following the determination of the quantity of light received by the digital capturing apparatus on a video flow or on the image to be captured, by taking account of the picture-taking data, such as the analogical gains, the digital gains and the exposure time (using an auto-exposure algorithm). Should the quantity of light be insufficient, the digital capturing apparatus equipped with a flash may trigger off the flash device in order to take the picture.

The flash corresponds to a light source and thus to an illuminant, the spectral distribution of which is known. In an implementation example of the invention, the case is also envisaged where the estimation of the illuminant is based on a calculation taking account of the illuminant of the scene without flash, as well as of the illuminant which is the flash in, for example, the case of an image capture where the subject is too far away for the flash to be efficient.

In a particular implementation mode, determination of the illuminant is performed by automatically extrapolating an illuminant of acquired digital images just before acquiring the digital image to be processed.

Most of the digital capturing apparatus are equipped with at least two operating modes, namely, one mode possibly qualified as the "preview" mode and one mode as the "capture" mode. The "capture" mode corresponds to a mode in which the image is processed by an algorithmic chain at maximal resolution. In order to allow the user to visualize the scene that he aims to capture, implementation of the "preview" mode enables him to obtain a continual video flow of images of dimensions often lower than the maximal resolution in order to comply with the time calculation constraints. Such video flow is obtained using images called "RAW" on which the illuminant is calculated for each image. The calculation of the illuminant is, for example, carried out using statistics determined on low-resolution images, such as the ratios between the color planes within the averaged zones of the low-resolution image, then by using, for example, a system of accumulation of such statistics in a calculation table containing the ratio values of the colors for the standard illuminants, such as tungsten, neon lighting, daylight for different temperatures and cloudy. In order to avoid quick changes in the illuminant calculations, the illuminants calculated on a certain number of images upstream from the common image of the video flow are taken into consideration in order to choose the illuminant of the common image. The same principle is applied when passing from the "preview" mode to the "capture" mode: the illuminant retained for the captured image may be that obtained by taking account of the illuminants of a certain number of images preceding the captured image. As an example, noting a transition of illuminants in the "preview" mode of a tungsten illuminant to a daylight illuminant, the data produced by the automatic white balance indicates the necessity to considerably increase the signal on the blue channel in a tungsten illuminant and more moderately in a daylight mode. During a number of pre-defined images, the passage of a moderate to high increase of the signal on the blue channel will be performed progressively, for example by defining several stages using the intensity of the gain to be applied on the blue channel.

In comparison, the calculation of the illuminant on the RAW image is, for example, carried out using statistics determined on the maximal resolution image, such as the ratios between the color planes within the averaged zones of the maximal-resolution image, then by using, for example, a system of accumulation of such statistics within a calculation table containing the ratio values of the colors for the standard illuminants, such as tungsten, neon lighting, daylight for different temperatures and cloudy.

An additional step of the method according to embodiments of the invention includes the selection and/or the calculation of the modification parameters of a relative illumination phenomenon depending on the illumination determined during the first step.

The modification parameters of a relative illumination phenomenon are a modification of the colored relative illumination in each pixel of the pixel value on each channel. A modification of the colored relative illumination includes applying a gain in accordance with the position and/or the channel and/or the maximum of the channels and the illuminant in order to cancel the variations of intensity and of color depending on the position within the image provoked by the optical system and the sensor (including the optical elements, such as filters and micro-lenses).

An example of modification parameters for the colored relative illumination phenomenon is a polynomial for each color channel. The polynomials depend upon the position within the image. The polynomials may be in X,Y, X and Y, indicating the coordinates of the pixels within a 2D space, or polynomials in R, R indicating a distance to a point of the field considered as the geometric center of the image or elsewhere, the coordinates of the center possibly being different depending on the channels. The gain to be applied may be obtained by evaluating the polynomial in each pixel for each channel, or by using a table of values providing values for the geometric zones of the image like, for example, values every KX or KY pixels, KX and KY being for a 2D image, an equal or different number of pixels depending on the geometric coordinates of the image.

To this end, in a first implementation mode for this additional step, a selection of the modification parameters is made from among a list of pre-calculated and memorized parameters within a memory module accessible by the device implementing the method. The list of the pre-calculated parameters contains parameters corresponding to typical illuminants, such as, for example, the most frequent illuminants. In this first implementation mode, when an illuminant is determined and data relating to such illuminant is produced, but when the data designating such illuminant is not directly associated with the modification parameters, modification parameters associated with an illuminant marked by data nearest to the information produced is selected.

In a second implementation mode, when an illuminant is determined and data relating to such illuminant is produced, but when the data designating such illuminant is not directly associated with the modification parameters, modification parameters are calculated, which will correspond to the determined illuminant, using the pre-calculated parameters. The calculations are, for example, carried out by an identification mechanism of the illuminants the nearest to the identified illuminant for which the modification parameters are available. The illuminants the nearest to the identified illuminant are those illuminants whose data defines, for example, a dimension interval equal to the data amount of such illuminants containing the data of the identified illuminant. In an example, the modification parameters of the identified illuminant are determined by interpolating the modification parameters of the illuminants the nearest to the identified illuminant for which the modification parameters are available. Interpolation causes, for example, weighting to intervene enabling to provide extra weight on certain illuminants near to the identified illuminant in the choice of the modification parameters.

In certain implementation modes, the modification parameters do not only depend upon the determined illuminant, but also depend upon other parameters, designated as variable parameters, among which, for a digital image to be processed, can notably be found:

The focal length of the optical system, the relative illumination phenomenon depending upon the angle of the rays forming the image.

The opening of the diaphragm of an optical system.

The response of the digital sensors.

The focusing distance and/or the estimated distance from the imaged scene.

The use of accessories: using accessories such as filters or sun-shades may cause a relative illumination phenomenon.

The exposure level of the digital images may influence the relative illumination phenomenon. This phenomenon is provoked by a modification particular to the processing software integrated into the apparatus.

A second step of the method according to embodiments of the invention intervenes after the modification parameters have been selected or calculated. A third step can include modifying, on the digital image to be processed, an observed relative illumination phenomenon.

In a first implementation mode for this step, an operation is carried out including reducing and/or cancelling and/or bringing a first threshold value down below an offset relative illumination measurement within the image to be processed.

Modification parameters are used in order to apply gain in each pixel modifying the pixel value of each color channel of such pixel.

The modification parameters of the colored relative illumination may be estimated in each pixel by calculating the value of the polynomials depending upon the position of the pixels within the field of the image for each color channel. The polynomials may be in X,Y, X and Y indicating the coordinates of the pixels within a 2D space. The gains to be applied in order to modify the colored relative illumination into a position pixel X1, Y1 may be determined in each color channel by evaluating a polynomial in the X1, Y1 coordinates or in the X2, Y2 coordinates, corresponding, for example, to the center of a geometric zone containing the pixel X1, Y1 coordinates. The polynomials may be in R, R indicating a distance to a point of the field possibly being the geometric center of the image or elsewhere, the coordinates of the center possibly being different depending on the channels. The gains to be applied in order to modify the colored relative illumination into a pixel distanced by a distance R1 from a point of the field o1 may be determined in each color channel by evaluating a polynomial in the R1 distance or in a R2 distance, corresponding, for example, to the center of a geometric zone including the pixel located at the distance R1 from the field o1. The gains to be applied may be determined by accessing the digital data of a table of values providing values to be selected and/or calculated by interpolations, for the geometric zones of the image like, for example, the values every KX or KY pixels, KX and KY being for a 2D image, an equal or different number of pixels depending on the geometric coordinates of the image. The modification of the colored relative illumination into a pixel may be an application of a dimension matrix corresponding to the number of color channels of the squared pixel. In all the modification examples of the relative illumination mentioned above, it is possible to apply the weight factors on the intensity of the modification in each color channel, such as, for example, a coefficient k1 to be applied to a gain evaluated on a color channel c1, notably by one of the methods previously mentioned and a coefficient k2 to be applied to the gain evaluated on the color channel c2, notably by one of the quoted previous methods.

In a second implementation mode, an operation is carried out including reducing and/or cancelling and/or bringing, for each color channel, a second threshold value down below a relative illumination measurement within the image to be processed.

The modification parameters may, for example, be applied on the sensor in the case of the possible application of a different analogical gain per color channel in each photosite of the digital sensor during, for example, the transformation of photon energy into electric energy being translated by a pixel value in each channel and each pixel of the digital image.

The modification parameters may also be directly applied to the digital image at the same time as applying the digital gains, for example, by multiplying the pixel value in each pixel of each channel by the result of the digital gain of the corresponding color channel and of the evaluation result of the modification parameters of the colored relative illumination in this same color channel.

One or several of the two steps, and/or of the additional step, can be implemented inside the capturing apparatus acquiring the digital images, or inside any peripheral, for example, sophisticated printers or personal computers embedding an appropriate processing software, etc.

Embodiments of the present invention also concern any system, composed of one or several electronic apparatus, one of such apparatus possibly being, for example, the capturing apparatus acquiring the digital images, comprising various necessary means for implementing the methods according to embodiments of the invention. Among such means can be found, for example, white balance estimation algorithms, interpretation algorithms for the white balance estimation algorithms in order to determine an illuminant, means for memorizing pre-calculated modification parameters, calculation capacities integrated, for example, inside a microprocessor, modification parameters using pre-calculated modification parameters, algorithms for modifying pixel values in order to modify the relative illumination phenomenon.

The relative illumination modification may take account of certain pixel value specifications of a pixel in each color channel like, for example, saturated pixel values, i.e. pixel values equal or near to the maximal and/or minimal pixel value corresponding to the maximal and/or minimal amplitude of the sensor signal per color channel. Another example of the pixel values of a pixel in each channel is the result of a combination of the pixel values for each color channel of a pixel such as, for example, a linear combination of the pixel values of all the color channels of a pixel. Another example for taking account of the specifications of the pixel values of a pixel in each channel is the maintenance of the ratios between the pixel values for all the color channels depending on the first pixel value reaching a threshold value during application of the modification gain of the relative illumination on the pixel values of the considered pixel for each color channels.

A particular example of relative illumination is commonly referred to as "vignetting". Vignetting is a particular operation that can, for example, be implemented by opticians when designing the optics, which consists of blocking the rays on the edge of one or several lenses, thus having for effect the introduction of a relative illumination that is lower in the corners than in the center.

The invention claimed is:

1. A processing method for a digital image to be processed, representing a scene, the digital image to be processed being acquired using a digital capturing apparatus comprising a sensor and an optical system, the digital image to be processed being a superposition of several color channels, the method comprising:
predetermining, using a processor, as a function of asymmetries in a physical constitution of the sensor, for a predetermined number of illuminant types, relative illumination modification parameters dependent on a position of pixels within the sensor;
accessing the relative illumination modification parameters for each of the predetermined illuminant types that have been stored in memory including at least first illumination modification parameters for a first illuminant type and second illumination modification parameters for a second illuminant type;
determining an illuminant of the represented scene on the acquired image to be processed by application of a white balance estimation algorithm;
selecting, via the processor, one of the first illumination modification parameters and the second illumination modification parameters that is commensurate with the illuminant that has been determined; and
modifying, on the acquired image to be processed, a relative illumination by multiplication by pixel values of the first illumination modification parameters or the second illumination modification parameters that is selected according to the illuminant, the modifying being dependent on a position of pixels within the image.

2. The method according to claim 1, wherein modifying the relative illumination comprises modifying at least one of a relative illumination variation within the digital image and a relative illumination variation from a color channel to another digital image.

3. The method according to claim 2, wherein modifying the relative illumination is performed using relative illumination modification parameters.

4. The method according to claim 2, wherein the relative illumination modification parameters are at least one of selected and calculated.

5. The method according to claim 1, wherein the determination of the illuminant depends upon a choice by the user.

6. The method according to claim 1, wherein the determination of the illuminant depends upon an activation of a flash.

7. The method according to claim 3, wherein the relative illumination modification parameters have been pre-calculated for a determined number of illuminants.

8. The method according to claim 7, wherein relative illumination modification parameters for a particular image captured under a particular illuminant are calculated using all or part of the pre-calculated relative illumination modification parameters.

9. The method according to claim 3, wherein the digital image to be processed is a superposition of several color channels, the modification of relative illumination being performed for each color channel.

10. The method according to claim 9, wherein modifying the relative illumination comprises an operation including at least one of reducing a first threshold value, cancelling the first threshold value, and bringing the first threshold value down below an offset relative illumination measurement within the image to be processed.

11. The method according to claim 9 wherein modifying the relative illumination comprises an operation including at least one of reducing a second threshold value for each color channel, cancelling the second threshold value for each color channel, and bringing, for each color channel, the second threshold value down below a relative illumination measurement within the image to be processed.

12. The method according to claim 8, wherein the modification of relative illumination consists of applying a gain per pixel to at least one of the color channels.

13. The method according to claim 3, wherein the modification of relative illumination depends upon at least one variable parameter of the digital capturing apparatus, the variable parameter being at least one of a focal distance, a focusing distance, and a distance estimated from the imaged scene, an exposure time, a gain, a sensitivity, an exposure level, or an aperture used by the capturing apparatus in order to acquire the digital image to be processed.

14. The method according to claim 1, wherein the determination of the illuminant of the scene represented on the acquired digital image to be processed uses data from the illuminant of the scene on one or several acquired digital images prior to the digital image to be processed.

15. The method according to claim 1, wherein at least one of determining the illuminant, and modifying the relative illumination is carried out inside an external processing apparatus different from the digital capturing apparatus.

16. The method according to claim 1, wherein at least one of determining the illuminant, and modifying the relative illumination is carried out inside the digital capturing apparatus.

17. The method according to claim 1, wherein modifying the relative illumination takes account of at least one of specifications of one or several filters included in the optical system, and the sensor making the relative illumination change in accordance with the illuminant.

18. The method according to claim 1, wherein modifying the relative illumination takes account of specifications of an optical system presenting longitudinal chromatic aberrations making the relative illumination change in accordance with the illuminant.

19. A digital image-processing system, for processing a digital image representing a scene acquired using a digital capturing apparatus comprising a sensor and an optical system, the system being adapted to implement the method according to claim 1, the system comprising:
   means for determining the illuminant of the scene represented on the acquired digital image to be processed; and
   means for modifying, on the digital image to be processed, a relative illumination according to the illuminant.

* * * * *